Oct. 4, 1966
W. ROTH
3,276,257
GYROSCOPIC MASS FLOWMETERS
Filed Feb. 2, 1960
3 Sheets-Sheet 1
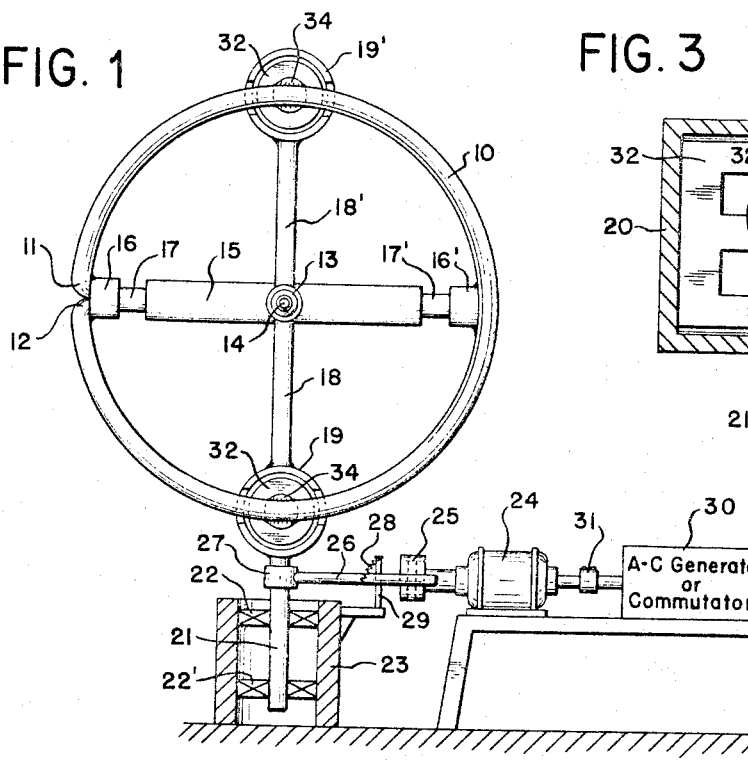
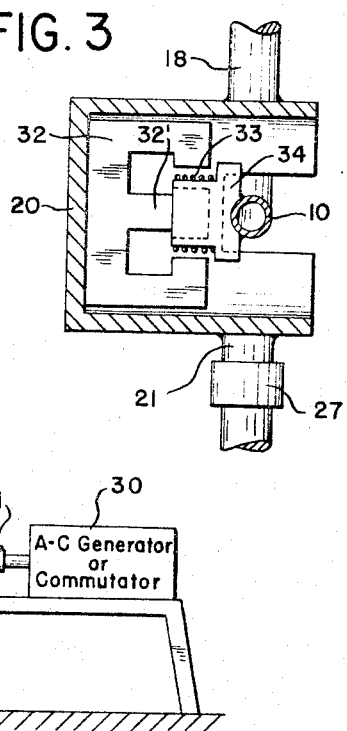
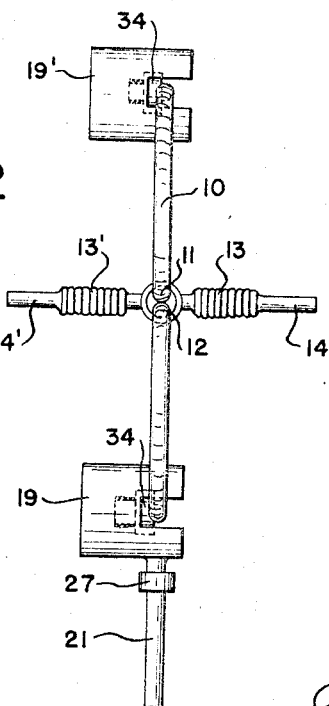
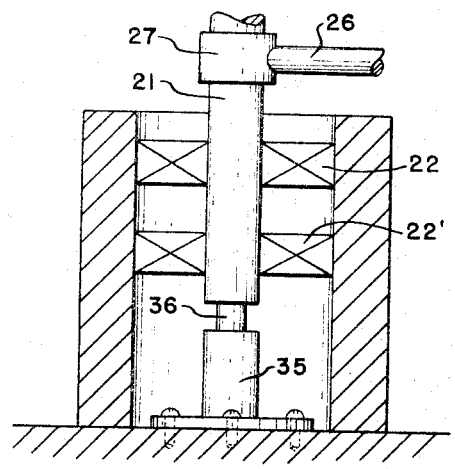
INVENTOR
Wilfred Roth
BY
ATTORNEYS Oct. 4, 1966  W. ROTH  3,276,257
GYROSCOPIC MASS FLOWMETERS
Filed Feb. 2, 1960  3 Sheets-Sheet 2

INVENTOR
Wilfred Roth
BY
ATTORNEYS

Oct. 4, 1966 W. ROTH 3,276,257
GYROSCOPIC MASS FLOWMETERS
Filed Feb. 2, 1960
FIG. 9
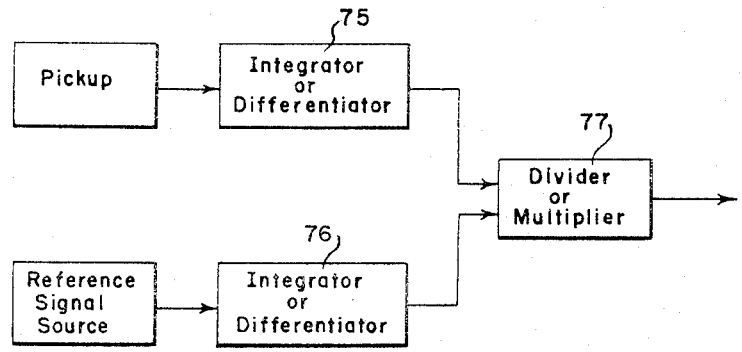
FIG. 10
FIG. 11
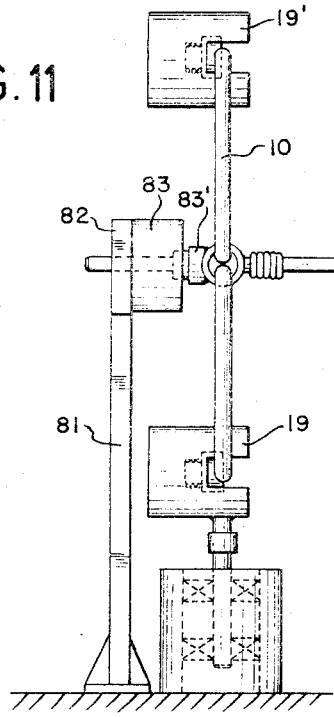
INVENTOR
Wilfred Roth
BY
ATTORNEYS United States Patent Office 3,276,257
Patented Oct. 4, 1966

3,276,257
GYROSCOPIC MASS FLOWMETERS
Wilfred Roth, 557 Asylum St., West Hartford, Conn.
Filed Feb. 2, 1960, Ser. No. 6,237
8 Claims. (Cl. 73—194)

This invention relates to gyroscopic mass flowmeters, particularly of the oscillating or A.-C. type.

Mass flowmeters of the gyroscopic type include a curved fluid conduit, usually of loop form, having an inlet and outlet conduit section connected therewith. The curved conduit is driven about a drive axis and fluid flowing in the conduit produces gyroscopic couples about a torque axis. The gyroscopic couples vary with the rate of mass flow of the fluid and transducer or pickup means responsive to the couples produces an output varying with the fluid flow. The curved conduit may be continuously rotated about its drive axis or may be oscillated thereabout. In the latter case the output is an alternating or A.-C. signal varying in amplitude with fluid flow.

The present invention is particularly concerned with the latter type of flowmeter. The theory and examples of suitable structures are given in my U.S. Patent No. 2,865,201, issued December 23, 1958.

Oscillating gyroscopic mass flowmeters are capable of a high degree of accuracy when properly designed and constructed. However, variations in the frequency of oscillation about the drive axis may result in errors in measurement, and extraneous signals in the transducer output may also give rise to errors.

It is a primary object of the present invention to provide a gyroscopic mass flowmeter of the oscillating type in which errors due to variations in the drive frequency are largely eliminated. Means for eliminating extraneous signals in the pickup output may also be included, thereby yielding an instrument of high accuracy capable of functioning under adverse environmental conditions.

As will be shown hereinafter, the output signal of an oscillating gyroscopic mass flowmeter employing a constant amplitude drive and a velocity type of transducer is an A.-C. signal having an amplitude factor varying with the mass flow rate and an amplitude factor varying as the square of the frequency of oscillation about the drive axis. Thus variations in the drive frequency result in an error in the measurement of mass flow.

In many parts of the country the A.-C. power line frequency is held quite constant and in such cases a synchronous driving motor may suffice to maintain the oscillating frequency sufficiently constant. This is not always true, particularly where high accuracy is demanded.

In many situations a source of constant frequency is not readily available, for example in remote locations where local generators are employed, in aircraft, etc. Also, it may be desired to employ induction motors or other nonsynchronous types of drive. In such cases variations in the frequency of oscillation may give rise to considerable error.

Since a mass flowmeter is commonly expected to be quite accurate in order to justify its use over a volume flowmeter, it will be understood that making the output independent of drive frequency is very important.

In accordance with the present invention, means are employed for performing calculus operations (that is, integration or differentiation) on the flowmeter output signal, or on an A.-C. reference signal, or both, to reduce or substantially eliminate the drive frequency dependency. When the reference signal is used, means are employed to perform an algebraic operation on the resulting signals.

It is preferred at the present time to integrate the transducer output signal a sufficient number of times to substantially eliminate the frequency amplitude factor. With a constant amplitude drive and a velocity type transducer in which the frequency amplitude factor is a squared term (exponent of 2), integrating the output signal twice will eliminate the frequency amplitude factor if the integration is sufficiently perfect. For other type transducers or drive, in which the frequency amplitude factor of the output signal has a different exponent, the number of stages of integration may be altered accordingly. This procedure not only eliminates the frequency amplitude factor, but has the further advantage that the integration process discriminates against extraneous signals of higher frequency in the transducer output. Inasmuch as such extraneous signals may be of considerable amplitude as compared to the desired signal represesnting fluid flow, this discrimination is valuable.

Another manner of eliminating the frequency dependency factor is to generate an A.-C. reference signal having a frequency equal to the frequency of oscillation about the drive axis and an amplitude proportional to the frequency. This reference signal is then differentiated to obtain a signal of the same frequency but with an amplitude proportional to the square of the frequency. The transducer output signal is then divided by the differentiated reference signal to obtain a resultant output in which the frequency amplitude factor is substantially eliminated. Instead of differentiating and dividing, the reference signal may be triple integrated to obtain a signal of the original frequency but with an amplitude inversely proportional to the square of the frequency. The transducer output signal may then be multiplied by the integrated reference signal to obtain a resultant output signal in which the frequency amplitude factor is substantially eliminated.

The reference signal may have an amplitude factor in various powers of frequency, depending upon the means by which it is generated, and in some cases may have an amplitude independent of frequency. However, by integration or differentiation, a signal may be obtained which has the amplitude factor raised to the proper power for subsequent algebraic operations.

A combination of both procedures may be employed if desired. Thus, calculus operations may be performed on both output and reference signals to obtain corresponding signals in which the frequency amplitude factors occur with the proper exponential factors for the subsequent algebraic operation. In general, the type of calculus operation and the number of repetitions will be selected so that the arithmetic difference between the frequency amplitude factors is reduced. Then, by multiplication or division, as the case may be, a resultant output is obtained in which the frequency amplitude factor has a reduced exponent. Preferably the arithmetic difference is zero so that the frequency amplitude factor is eliminated. If not, a subsequent calculus operation may be performed to complete the elimination.

Even though the frequency amplitude factor is eliminated as above discussed, there may be extraneous signal components in the transducer output arising from turbulence in the flow of liquid, flexural vibration of the loop conduit, general effects of vibration conditions in the vicinity of the flowmeter, etc. The loop has a natural mechanical resonant frequency about its torque axis and thus extraneous signal components at this natural resonant frequency are prone to be produced. Sharp filtering may be employed to eliminate these extraneous frequencies, but the design of a constant gain amplifier having a very narrow band characteristic is difficult in many cases. A synchronous detector supplied with the transducer output signal or a signal corresponding thereto, along with an A.-C. reference signal, may be employed to eliminate many of these extraneous frequencies.

Sharp filtering will not eliminate extraneous signals at or near the drive frequency, and synchronous detection will not eliminate an extraneous signal at the drive frequency unless it happens to be in quadrature with the desired signal. Therefore, in accordance with the invention two pickup transducers are advantageously employed, located on opposite sides of the torque axis. The transducers are connected in series aiding, that is, with polarities selected so that the fluid flow signals add. Since portions of the loop on opposite sides of its torque axis will be moving in opposite directions in producing flow rate signals, in additive connection for these signals will be a subtractive connection for signals resulting from translational displacement of the loop due to environmental conditions. Thus such extraneous signals will be partially or completely cancelled, whether at or near the drive frequency, or above or below it.

A similar two transducer arrangement may also be employed to generate a reference signal, as will be described hereinafter.

The invention will be more fully understood from the following description of specific embodiments thereof, taken in conjunction with the drawings in which:

FIG. 1 is an elevation of a representative A.-C. gyroscope mass flowmeter with certain features of the invention incorporated therein;

FIG. 2 is a left elevation of the loop and transducer structure of FIG. 1;

FIG. 3 is a detail showing one form of velocity transducer which may be employed;

FIG. 4 is a detail showing a modification of the drive axis structure to incorporate mechanical resonance therein;

FIG. 9 is a block diagram illustrating various combinations of calculus and algebraic operations for eliminating drive frequency dependency;

FIG. 10 is an elevation of a modification of FIG. 1 employing a pair of transducers for generating a reference signal; and FIG. 11 is a left elevation of the modification of FIG. 10.

Figure 5:
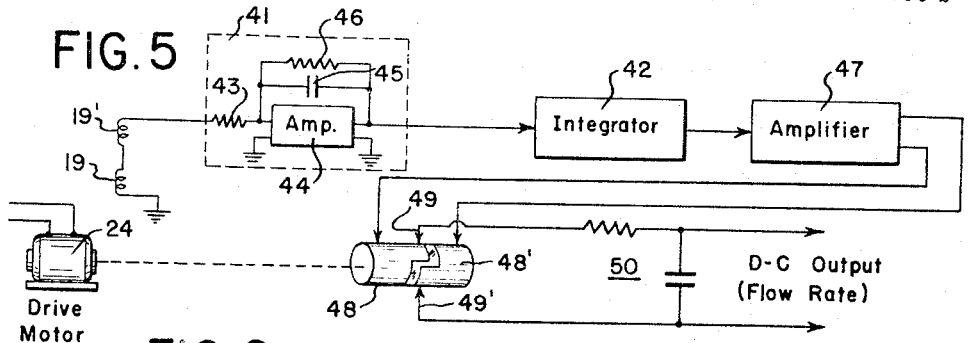
FIG. 5 illustrates a preferred embodiment of the invention employing integration for eliminating drive frequency dependency.

Referring to FIGS. 1 and 2, a gyroscopic mass flowmeter having a structure similar to that shown in my Patent 2,865,201 is illustrated. The curved fluid conduit is shown in the form of a loop 10 bent inwardly at 11 and 12 to form inlet and outlet fluid conduit sections extending to the center of the loop, and then connected by flexible means such as bellows 13, 13' to conduit 14, 14' through which fluid flow is to be measured. Member 15 is hollow and the ends 16, 16' thereof are attached to the loop. Sections 17, 17' of reduced cross-section serve as torsional springs to provide a restoring force urging loop 10 to the neutral position shown. The axis of member 15 is the torque axis, and is here assumed to be horizontal.

Member 15 is attached to vertical members 18, 18' and output or pickup transducers 19, 19' are attached at the ends of 18, 18', respectively. Shaft 21 is attached to the lower portion of transducer 19 and is rotatably mounted by bearings 22, 22' in housing 23 for rotational oscillation. The axis of shaft 21 is the drive axis. The loop structure is oscillated about the drive axis by motor 24 through an eccentric cam 25 bearing against a rod 26 affixed to the shaft 21 by collar 27. Spring 28 is attached at one end to rod 26 and at the other end to a stationary support 29 so as to hold the rod in engagement with the cam. For convenience of illustration the point at which the spring 28 is attached to support 29 is shown lying above the rod, but in practice it will ordinarily be in line with the rod.

A reference signal generator or a commutator 30 is shown attached to the shaft of motor 24 by collar 31. When an A.-C. signal is desired for drive frequency elimination or synchronous detection purposes, element 30 may be a generator. However, synchronous detectors may employ commutation instead of an electrical signal for synchronization purposes, in which case element 30 may be a commutator. Inasmuch as the frequency and phase of the oscillation of the drive axis 21 will be fixed with respect to the rotation of the shaft of motor 24, the frequency and phase of the A.-C. reference signal or commutation will be substantially fixed with respect to the loop oscillation about the drive axis.

FIG. 3 shows a detail of a suitable pickup transducer. As shown, the transducer has a casing 20 attached to the drive shaft 21, and a core 32 of magnetic material such as iron is mounted therein. A permanent magnet is employed to establish a magnetic field, and may conveniently be the center pole 32'. Coil 33 is mounted on a coil form 34 which is attached to the loop conduit 10. It will be understood that although the casing 20 is oscillating about the drive axis, it is fixed with respect to the torque axis. Consequently, movement of loop 10 about the torque axis will produce a corresponding movement of coil 33 in the magnetic field and a corresponding output voltage will be generated. The amplitude of oscillation about the drive axis is ordinarily quite small, and in some cases it may be satisfactory to mount the casings of the transducers so that they are fixed with respect to housing 23.

The transducer of FIG. 3 is of the so-called "velocity" type. The output voltage is proportional to the velocity of movement of the coil 33 with respect to the magnetic field. This type of transducer is presently preferred since minor displacements of coil and magnet resulting from distortion of the frame due to mechanical stresses, temperature changes, etc. will not appreciably affect the output. With a displacement type pickup, such distortions could give rise to a variable error. Also, the velocity type pickup produces a maximum output as the loop passes through its neutral position, so that it is not as sensitive to non-linearities in loop displacement as a displacement type pickup. Other forms of velocity pickups are known and may be employed if desired.

It will be noted that the transducers 19 and 19' are spaced apart in the direction of the drive axis (axis of shaft 21) and on opposite sides of the torque axis (axis of member 15). Accordingly, as the coil in one transducer moves to the right as seen in FIG. 2, the coil of the other transducer moves to the left. In FIGS. 1 and 2 the stators of the transducers are mounted on the same side of loop 10 so that the coils move oppositely with respect to their stators. If one transducer were moved to the opposite side of the loop 10, the coil-stator movement would be the same. In either case the transducers are connected in series so that the resultant voltages add for rotation about the torque axis.

If due to surrounding conditions forces are applied which tend to move the loop in translation, say inwards with respect to both pickups as seen in FIG. 2, the resultant generated voltages will oppose each other in the series circuit and thus completely or partially cancel. This is advantageous in many circumstances. It should be noted that this cancellation can be obtained even though the frequency of translation of the loop (or the transducer stators) is at or near the operating frequency. Such extraneous signals may be difficult or impossible to eliminate by sharp filtering or synchronous detection.

FIG. 4 shows a modification of FIG. 1 in which the drive shaft 21 is connected to a stationary base section 35 through a section 36 of reduced cross-section which acts as a torsional spring. The moment of inertia of the loop structure about the drive axis may be selected to give mechanical resonance at or near the drive frequency, thus reducing the power required of the driving means. It should be noted that, with the motor and cam arrangement of FIG. 1, the drive oscillation of the loop is still under the control of the motor and the loop continues to oscillate about the drive axis with fixed amplitude determined by the cam.

The theory of operation of mass flowmeters of the type illustrated in FIG. 1 is discussed in some detail in my Patent 2,865,201, and the basic equation for the displacement of the loop about its torque axis (axis of member 15) is given by Equation 1 of that patent. Utilizing that equation and assuming a velocity-type transducer pickup, the output of the pickup may be expressed as:

$$V = \frac{k}{g}\frac{dW}{dt}\left[\frac{2\pi R^2 \phi \omega^2}{k_x\left(1-\frac{\omega^2}{\omega_x^2}\right)}\right]e^{iwt} \qquad (1)$$

where $V$ = pickup voltage output
$k$ = a constant
$g$ = acceleration of gravity
$W$ = pounds of material flowing across any cross section of the loop
$t$ = time in seconds
$R$ = radius of the loop
$\phi$ = maximum angular displacement of the loop about the drive axis for a constant amplitude drive source
$\omega = 2\pi$, where $f$ is the frequency of oscillation about the drive axis
$k_x$ = spring constant of the constraint about the torque axis, and
$\omega_x = 2\pi f_x$, where $f_x$ is the natural resonant frequency of the loop conduit about its torque axis.

The term $\omega$ will be called a "frequency" term, since it is equal to $f$ multiplied by $2\pi$ and is often called angular frequency. In the above equation it will be observed that a squared frequency term occurs in the numerator so that the pickup output will vary as the square of the frequency of oscillation about the drive axis. The term also appears in the denominator in the expression $(1-\omega^2/\omega_x^2)$. Normally the apparatus will be designed so that the natural resonant frequency about the torque axis is high compared to the drive frequency. For example, in one embodiment the natural resonant frequency is about 100 cycles per second and the drive frequency 10 cycles per second. It will thus be seen that the effect of variations in drive frequency in the denominator are very small and may be neglected. However, the frequency amplitude factor $\omega^2$ in the numerator may cause substantial errors in many situations.

In a particular instrument, many of the factors in Equation 1 are constant or practically so. Accordingly the equation can be simplified as follows:

$$V = K\frac{dW}{dt}\omega^2 \cos \omega t \qquad (2)$$

Here, the exponential function indicating an alternating quantity is given a a cosine function.

Referring now to FIG. 5, a preferred embodiment of the invention is illustrated in which integration is employed to eliminate the frequency amplitude factor $\omega^2$ in Equation 2. Here the outputs of pickup transducers 19, 19' are supplied to an integrator 41, whose output can be expressed as:

$$V' = K\frac{dW}{dt}\omega \sin \omega t \qquad (3)$$

It will be observed that the frequency amplitude factor has now been reduced to the first power of frequency. This output is then supplied to a second integrator 42, whose output can be expressed as:

$$V'' = -K\frac{dW}{dt} \cos \omega t \qquad (4)$$

As will be observed, the frequency amplitude factor has now been eliminated. The equation is otherwise the same as Equation 2, except for the minus sign which indicates a phase shift of 180°.

Many forms of integrators are known in the electronic art, particularly in the computer field. A simple integrating circuit is a series resistor and shunt capacitor. The integration thus produced is somewhat imperfect and considerable amplification is required. It is preferred to employ an operational amplifier in which integration is produced by feedback through a capacitor, thus resulting in more perfect integration.

Such an integrator is shown in block 41 as a series resistor 43 and amplifier 44, with negative feedback through capacitor 45. Since it is only necessary to nntegrate over the expected variation in drive frequency, resistor 46 may be provided to bypass the capacitor at frequencies well below the drive frequency, and amplifier 44 may be A.-C. coupled with a cutoff frequency well below the drive frequency. The assists in stabilizing integration.

In the integration yielding in Equations 3 and 4, the flow rate factor $dW/dt$ was treated as a constant. This is proper when changes in flow are slow compared to the operating frequency. For purposes of analysis, fluctuating flow may be treated as having a constant component giving a sinusoidal output voltage, and an A.-C. component which amplitude-modulates the output voltage. With the drive frequency considerably higher than frequency components in the modulation, accurate response to the fluctuating flow may be obtained. As the frequency of the modulation approaches the drive frequency, some error in indicating the instantaneous rate of mass flow may occur, although not in indicating the average flow rate. Thus it is desirable to select an operating frequency considerably higher than the expected fluctuations in flow, where rapid response and accurate instantaneous rates are required.

An integrator has a slope characteristic which attenuates higher frequency signals at the rate of 6 db per octave. Consequently the double integration shown in FIG. 5 results in overall attenuation of 12 db per octave, which markedly discriminates against extraneous signals of higher frequency than the drive frequency. For example, in one specific embodiment the drive frequency is 10 c./s. and the natural resonant frequency of the loop about the torque axis, where the largest amplitude extraneous signals are most likely to be encountered, is about 100 c./s. Frequencies in the neighborhood of 100 c./s. are greatly attenuated in the output of integrator 42. There is the further advantage that stages following the integrators, such as amplifier 47, need not have as large a dynamic range due to the reduction in amplitude of higher frequency extraneous signals.

The integrated output signal is supplied to a suitable detector to obtain a D.-C. output varying with fluid flow. Alhough various types of detectors may be employed, it is preferred to use a synchronous detector synchronized at the frequency of oscillation about the drive axis in order to discriminate against any extraneous signals remaining in the signal channel and also to indicate a reversal of fluid flow.

In FIG. 5 the synchronous detector takes the form of a rotating commutator of known construction, driven by motor 24. The output of amplifier 47 is supplied to brushes contacting the two commutator segments 48, 48' in respective outer regions where each segment is circumferentially continuous. A pair of brushes 49, 49' engage the commutator in the overlap region of segments 48, 48' so as to yield an output which reverses in phase for each half rotation of the commutator. Accordingly, the signal is rectified and the rectified signal is applied to filter 50 which produces a D.-C. output varying with the mass flow rate. The operation of such a synchronous detector is well known in the art and need not be described further.

The output may be used to actuate a meter to indicate flow rate, and also may be supplied to a totalizer such as a watthour meter, counter, etc. to obtain total fluid flow.

With the commutator phased to give one polarity of D.-C. output for fluid flow in one direction, a reversal of polarity will occur for reversed fluid flow. In such case the transducer output signal will reverse in phase, thus causing the signal to commutator segments 48, 48' to reverse in phase and yield a rectified output of opposite polarity.

Figure 6:
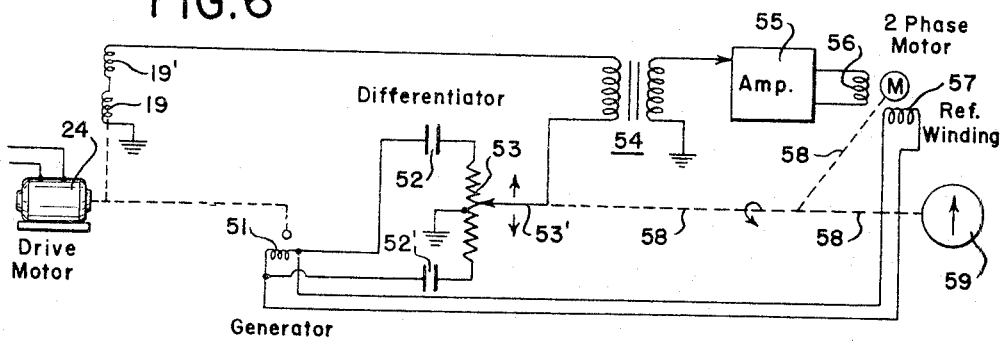
FIG. 6 illustrates a null-type of system employing a differential reference signal.

FIG. 6 shows another embodiment of the invention in which a reference signal is employed in the elimination of the frequency amplitude factor. Here a single phase generator 51 is driven by motor 24 and yields an output voltage which can be expressed as:

$$E = K'\omega \sin \omega t \qquad (5)$$

This reference voltage E is of the same frequency as the drive frequency in Equation 2, and has an amplitude factor $\omega$ directly proportional to the frequency. It is expressed as a sine rather than a cosine function to indicate that it is 90° out of phase with the signal output from pickup transducers 19, 19'. This relative phase can be obtained by proper orientation of the generator shaft with respect to the motor shaft.

The reference voltage is differentiated by suitable means, here shown as a circuit including capacitors 52, 52' and potentiometer 53, a center-tap on the potentiometer being grounded. The voltage across the potentiometer can then be expressed as:

$$E' = dE/dt = K'\omega^2 \cos \omega t \qquad (6)$$

It will be observed that the frequency amplitude factor is now squared, and accordingly is raised to the same exponent as that of the signal voltage given by Equation 2.

The slider 53' of the potentiometer is connected to the primary of transformer 54 and the pickups are also connected thereto. The connections are such that the resultant voltage impressed on the primary is equal to the difference between the two voltages, that is, equal to $V - K''E'$. Here $K''$ represents the portion of the voltage across the potentiometer which is picked off by slider 53'. Since the potentiometer is grounded at its center-tap, movement of slider 53' from one side to the other of the center-tap will reverse the phase of the voltage picked off, with respect to ground.

The secondary of transformer 54 is connected through an amplifier 55 to one winding 56 of a two-phase motor. The reference voltage from generator 51 is supplied to the second winding 57 which is in quadrature with the first. As is well known, a two-phase motor produces a steady state torque only when the excitation of both windings is of the same frequency. The torque is proportional to the product of the amplitudes of the two excitations and the sine of the phase angle therebetween. Thus for given amplitudes of excitation the torque is maximum when the phase angle is 90°. The direction of shaft rotation depends on which excitation leads the other.

In this embodiment, the excitation of winding 57 is a sine function and that of winding 56 a cosine function of the same frequency for the fundamental signal component. Accordingly the excitations have a 90° phase angle therebetween. The excitation in winding 56 will lead that in 57 for one direction of fluid flow, and lag for the opposite direction, producing corresponding directions of shaft rotation.

The shaft is connected to drive the slider 53' in the direction to reduce the difference between the two voltages applied to the transformer primary. Thus the slider will be moved until the net voltage applied to the primary of transformer 54 is substantially zero. This reduces the excitation in winding 56 to zero and the motor stops. For this condition $V = K''E'$. Accordingly, $$K'' = \frac{V}{E'} = \frac{K}{K'} \frac{dW}{dt} \qquad (7)$$

It is thus seen that the position of the slider 53', and the corresponding angular displacement of shaft 58, is equal to the pickup output voltage divided by the differentiated reference voltage, and is proportional to the rate of mass flow. Therefore, when the motor has reached its null position, the angular displacement of shaft 58 corresponds to the rate of mass flow and is independent of the frequency amplitude factor in the pickup voltage.

The shaft may be used to drive an indicator 59 in any desired manner. It is often convenient to convert the shaft position into an electrical signal for indicating purposes. This may be readily accomplished by means known in the art, such as connecting the shaft to the slider of an auxiliary potentiometer supplied with a constant D.-C. voltage. The voltages at the slider will then represent mass flow rate. The shaft displacement will change as the rate of mass flow changes. A totalizer can also be arranged to respond to the shaft output.

Inasmuch as the two-phase motor will not produce a steady state torque for frequency components in coil 56 which are different from the frequency in coil 57, many extraneous signals will be eliminated. Accordingly, the system of FIG. 6 provides an output (displacement of shaft 58 or a signal derived therefrom) representing the mass flow rate independent of the frequency amplitude factor and free of extraneous signal components in the pickup transducer output.

Figure 7:
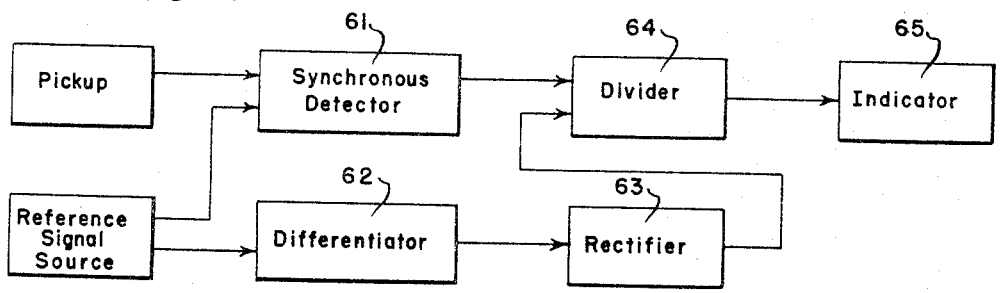
FIG. 7 is a block diagram of another embodiment of the invention employing a differentiated reference signal.

Referring now to FIG. 7, another embodiment is shown in block form. Here the pickup output signal and reference signal are supplied to a synchronous detector 61 which is assumed to be of the type giving a D.-C. output proportional to the amplitude of the pickup signal component which has the same frequency as that of the reference signal. One example of such a detector is shown in FIG. 8.

The pickup and reference signals are assumed to have frequency amplitude factors as indicated by Equations 2 and 5, respectively. The relative phase of the signals is determined to suit the particular synchronous detector employed. The reference signal is also supplied to a differentiator 62 to yield a corresponding signal in which the frequency amplitude factor is squared. This signal is then rectified in 63 to obtain a corresponding D.-C. signal which is supplied to a divider 64 along with the D.-C. output of the synchronous detector. Accordingly, the D.-C. mass flow rate signal is divided by the differentiated and rectified signal, yielding an output whose magnitude is independent of variations in the frequency of oscillation about the drive shaft. By virtue of the synchronous detection, it also is substantially independent of extraneous signals of different frequency. The output of the divider is then supplied to an indicator 65.

Figure 8:
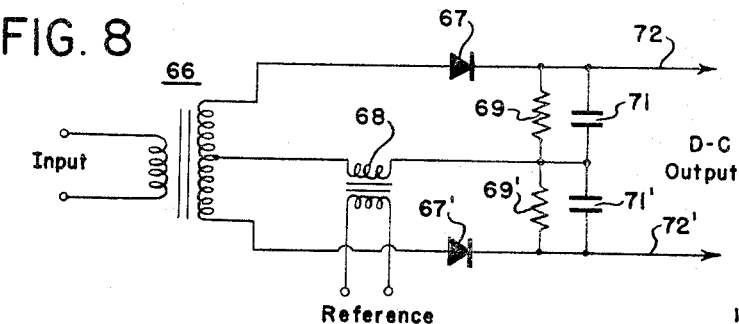
FIG. 8 illustrates an electronic type of synchronous detector.

FIG. 8 shows one form of electronic synchronous detector which is well known in the art. Here the input signal is fed through a transformer 66 to a pair of diodes 67, 67'. The secondary of transformer 66 is center-tapped, and a reference signal supplied thereto through transformer 68. The output circuit includes resistors 69, 69' shunted by capacitors 71, 71'. With a reference signal of sufficient amplitude (greater than one-half the input signal appearing across the secondary of transformer 66), the output in line 72, 72' will be a D.-C. output varying with the amplitude of the input signal component which has the same frequency as the reference signal. Proper phase relations between the input and reference signals are maintained, as is known in the art.

With the detector of FIG. 8 used in the arrangement of FIG. 7, the reference signal is advantageously exactly in phase with the pickup signal for one direction of fluid flow, yielding a D.-C. output of one polarity. If fluid flow reverses, the pickup signal phase will reverse, yielding a D.-C. output of opposite polarity. Divider 64 may be designed to respond to the opposite polarities of signal from detector 61 so that its output indicates direction of flow.

In the arrangement of FIG. 5, calculus operations are performed on the pickup signal and no reference signal is involved in eliminating the frequency amplitude factor. On the other hand, in FIGS. 6 and 7 a reference signal is employed in the elimination of the frequency amplitude factor, and the calculus operation is performed on the reference signal only. FIG. 9 is a block diagram illustrating the manner in which a reference signal may be employed and calculus operations performed on both pickup and reference signals.

Referring to FIG. 9, the output of the pickup is supplied to means for performing a calculus operation thereon shown by block 75. Ordinarily the operation will be integration, but in some circumstances it might be differentiation. The reference signal is also supplied to means for performing a calculus operation thereon, indicated by block 76. Either integration or differentiation may be performed in block 76. The outputs of the two blocks 75, 76 are then supplied to means for performing an algebraic operation thereon, shown by block 77. The algebraic operation may be division or multiplication, depending upon preceding operations.

The overall procedure will be clearer if it is realized that an integration reduces the exponent of the frequency amplitude factor by 1, for each stage of integration, whereas differentiation increases the exponent by 1 for each stage of differentiation. If the initial signal, or a derived signal, does not have a frequency amplitude factor, this is treated as a frequency term with an exponent of zero ($\omega^0$), which is equal to unity. The foregoing statements then apply.

Advantageously the pickup and reference signals are operated upon until the exponents of the respective frequency amplitude factors have the same arithmetical value. If the exponents occur with the same sign (e.g., both factors in the numerator), division of one signal by the other will eliminate the frequency amplitude factor. If the exponents occur with opposite signs (e.g. one factor in the numerator and the other in the denominator), multiplication may be employed to eliminate the frequency amplitude factor. It is also possible to select the number and type of calculus operations performed on each signal so that the arithmetic difference between the exponents of the respective frequency amplitude factors is reduced, but not to zero. In such case, the subsequent division or multiplication will yield a resultant output in which the frequency factor is reduced but not eliminated. Then, a subsequent integration or differentiation can be employed to eliminate the factor.

As examples, if the output signal has a term $\omega^3$ and the reference signal $\omega$, the former may be integrated once and the latter differentiated once to obtain $\omega^2$ factors. Then the former may be divided by the latter to eliminate the factor. If the ouput signal has a term $\omega^2$ and the reference signal $\omega$, the former may be integrated once to yield an $\omega$ term, and the latter integrated twice to obtain a $1/\omega$ term, in which case the two signals may be multiplied to eliminate the frequency amplitude factor. If the reference signal is integrated once instead of twice, the resultant output will still contain an $\omega$ term to the first power, which may be eliminated by a subsequent integration.

With the foregoing examples and the general principles stated, the manner in which different combinations of integration and differentiation may be employed to yield the desired result is believed clear.

In FIG. 1 the reference signal generator is shown coupled directly to the driving motor, since the cam mechanism insures that the oscillation about the drive axis (axis of shaft 21) will be constant in frequency and phase with respect to the motor, and constant in amplitude. With other types of drives in which the coupling between the drive source and the drive axis is not fixed, it may be desirable to mount a suitable generator on the drive shaft 21 itself. Even so, it is possible in some cases that the motion of the loop 10 about the drive axis will not rigorously correspond to the drive shaft movement due, for example, to the flexibility in members 17, 17', etc. Changes in amplitude and phase of the loop oscillation about the drive axis with respect to shaft 21 are therefore possible.

Such changes in phase will produce corresponding changes in the phase of the output signal and, if the phase of the reference signal does not change by the same amount, adverse effects may result as will be understood from the foregoing discussion. Changes in amplitude of the loop oscillation about the drive axis will also produce corresponding changes in the output signal, as will be recognized from the factor $\phi$ in Equation 1. Thus K in Equation 2 will not be truly constant.

When a reference signal is used in eliminating the frequency amplitude factor, as in FIGS. 6 and 7, it is desirable to have the reference signal amplitude change with amplitude of loop oscillation about the drive axis in the same manner as the output signal. Then a division operation eliminates the change in the output signal. This is illustrated, for example, in Equation 7. If K and K' change in the same manner, the quantity $K/K'$ remains a constant.

Where the foregoing adverse effects are found important, the arrangement shown in FIGS. 10 and 11 may be employed.

Referring to FIGS. 10 and 11, a flowmeter structure is shown which is similar to FIGS. 1 and 2. However, the A.-C. reference signal is generated by transducers which respond to movement of the loop itself about the drive axis. To this end, a stanchion 81 is provided having a cross member 82 at the ends of which a pair of transducers 83 and 84 are mounted. These may take the form shown in FIG. 3. The cooperating coils are attached to the loop at 83' and 84'. Thus they are spaced apart in the direction of the torque axis and on opposite sides of the drive axis. As the loop is oscillated about the drive axis, corresponding A.-C. voltages will be generated by transducers 83, 84. Inasmuch as the transducers are mounted beyond the flexible sections 17, 17', flexibility in the latter will not prevent the reference voltage from accurately representing the loop movement in amplitude, frequency and phase.

Although a single transducer could be employed for the purpose, the use of two transducers with the outputs connected in series aiding for loop oscillation about the drive axis has the advantage that translation of the loop with respect to the pickups in the horizontal plane will produce corresponding voltages in the transducers which partially or completely cancel each other.

It will be noted that the pickup coils 83', 84' also oscillate about the torque axis. The amplitude of the oscillations is ordinarily very small. The air gap in the stator of the pickup (FIG. 3) may be made sufficiently wide to accommodate such slight angular movement of the coil therein, and with an axially uniform magnetic field little or no output will result from the angular movement. Further, with the transducers connected in series aiding for oscillation about the drive axis, cancellation of any residual outputs due to rotation of the coils about the torque axis will be obtained.

From the above considerations, it will be understood that it is possible in some cases to mount pickup transducers 19, 19' so that their stators are fixed with respect to the base of the flowmeter, rather than fixed with respect to the drive axis as illustrated.

The invention has been described in connection with several specific embodiments thereof. It will be understood that many changes in the specific embodiments may be made within the spirit and scope of the invention, and that other embodiments utilizing the principles of the invention may be made.

I claim:

1. A gyroscopic mass flowmeter which comprises a curved fluid conduit and inlet and outlet conduit sections connected therewith, means for oscillating said curved conduit about a drive axis to produce gyroscopic couples about a torque axis varying with fluid flow in the conduit, transducer means responsive to said gyroscopic couples for producing a substantially sinusoidal alternating output signal, said alternating output signal varying in amplitude with fluid flow and having a frequency amplitude factor $\omega^x$ where $\omega$ is the angular frequency of oscillation about the drive axis and $x$ is at least 1, said alternating output signal having an amplitude factor proportional to the rate of fluid flow and a frequency amplitude factor $\omega^x$ where $\omega$ is the angular frequency of oscillation about the drive axis and $x$ is at least 1, and means for integrating said output signal to produce a resultant alternating signal having an amplitude factor proportional to the rate of fluid flow in which the exponent of said frequency amplitude factor is reduced by at least 1.

2. A gyroscopic mass flowmeter which comprises a curved fluid conduit and inlet and outlet conduit sections connected therewith, means for oscillating said curved conduit about a drive axis to produce gyroscopic couples about a torque axis varying with fluid flow in the conduit, transducer means responsive to said gyroscopic couples for producing an alternating output signal, said alternating output signal varying in amplitude with fluid flow and having a frequency amplitude factor $\omega^x$ where $\omega$ is the angular frequency of oscillation about the drive axis and $x$ is at least 1, and means for integrating said output signal to produce a resultant alternating signal varying in amplitude with fluid flow, the number of integrations being predetermined to substantially eliminate the frequency amplitude factor in said resultant alternating signal.

3. A gyroscopic mass flowmeter which comprises a curved fluid conduit and inlet and outlet conduit sections connected therewith, means for oscillating said curved conduit about a drive axis to produce gyroscopic couples about a torque axis varying with fluid flow in the conduit, transducer means responsive to said gyroscopic couples for producing a substantially sinusoidal alternating output signal, said alternating output signal varying in amplitude with fluid flow and having a frequency amplitude factor $\omega^x$ where $\omega$ is the angular frequency of oscillation about the drive axis and $x$ is at least 1, said alternating output signal having an amplitude factor proportional to the rate of fluid flow and a frequency amplitude factor $\omega^x$ where $\omega$ is the angular frequency of oscillation about the drive axis and $x$ is at least 1, means for integrating said output signal to produce a resultant alternating signal having an amplitude factor proportional to the rate of fluid flow in which the exponent of said frequency amplitude factor is reduced by at least 1, and means for detecting said resultant alternating signal to yield a D.-C. output varying with fluid flow.

4. A gyroscopic mass flowmeter which comprises a curved fluid conduit and inlet and outlet conduit sections connected therewith, means for oscillating said curved conduit about a drive axis to produce gyroscopic couples about a torque axis varying with fluid flow in the conduit, transducer means responsive to said gyroscopic couples for producing an alternating output signal, said alternating output signal varying in amplitude with fluid flow and having a frequency amplitude factor $\omega^x$ where $\omega$ is the angular frequency of oscillation about the drive axis and $x$ is at least 1, means for integrating said output signal to produce a resultant alternating signal varying in amplitude with fluid flow, the number of integrations being predetermined to substantially eliminate the frequency amplitude factor in said resultant signal, and synchronous detector means supplied with said resultant signal and synchronized at the frequency of oscillation about said drive axis.

5. A gyroscopic mass flowmeter which comprises a curved fluid conduit and inlet and outlet conduit sections connected therewith, means for oscillating said curved conduit about a drive axis to produce gyroscopic couples about a torque axis varying with fluid flow in the conduit, transducer means of the velocity type responsive to said gyroscopic couples for producing an alternating output signal varying in amplitude with said fluid flow and having an amplitude factor varying as the square of the frequency of oscillation about said drive axis, and means for double integrating said output signal to produce a resultant alternating signal varying in amplitude with fluid flow in which said frequency amplitude factor is substantially eliminated.

6. A gyroscopic mass flowmeter which comprises a curved fluid conduit and inlet and outlet conduit sections connected therewith, means for oscillating said curved conduit about a drive axis to produce gyroscopic couples about a torque axis varying with fluid flow in the conduit, transducer means of the velocity type responsive to said gyroscopic couples for producing an alternating output signal varying in amplitude with said fluid flow and having an amplitude factor varying as the square of the frequency of oscillation about said drive axis, double integrating means supplied with said output signal for producing a resultant alternating signal varying in amplitude with fluid flow in which said frequency amplitude factor is substantially eliminated, and synchronius detector means supplied with said resultant signal and synchronized at the frequency of oscillation about said drive axis for yielding a D.-C. output varying with fluid flow.

7. A gyroscopic mass flowmeter which comprises a fluid conduit of loop form and inlet and outlet conduit sections connected therewith, means mounting said loop for angular oscillation about a drive axis approximately in the plane of the loop and about a torque axis approximately perpendicular to the drive axis, means for oscillating said loop about said drive axis to produce gyroscopic couples about said torque axis varying with fluid flow in the loop, a pair of transducers of the velocity type spaced apart in the direction of said drive axis on approximately diametrically opposite sides of the torque axis and responsive to oscillations of the loop about the torque axis, said transducers being connected in series aiding for oscillations of the loop about the torque axis and producing a substantially sinusoidal alternating output signal having an amplitude factor proportional to the rate of fluid flow and having a frequency amplitude factor $\omega^x$ where $\omega$ is the angular frequency of oscillation about said drive axis and $x$ is at least 1, and means for integrating said output signal to produce a resultant alternating signal having an amplitude factor proportional to the rate of fluid flow in which the exponent of said frequency amplitude factor is reduced by at least 1.

8. A gyroscopic mass flowmeter which comprises a fluid conduit of loop form and inlet and outlet conduit sections connected therewith, means mounting said loop for angular oscillation about a drive axis approximately in the plane of the loop and about a torque axis approximately perpendicular to the drive axis, means for oscillating said loop about said drive axis to produce gyroscopic couples about said torque axis varying with fluid flow in the loop, a pair of transducers of the velocity type spaced apart in the direction of said drive axis on approximately diametrically opposite sides of the torque axis and responsive to oscillations of the loop about the torque axis, said transducers being connected in series aiding for oscillations of the loop about the torque axis and producing an alternating output signal varying in amplitude with fluid flow and having a frequency amplitude factor $\omega^x$ where $\omega$ is the angular frequency of oscillation about said drive axis and $x$ is at least 1, means for integrating said output signal to produce a resultant alternating signal varying in amplitude with fluid flow, the number of integrations being predetermined to substantially eliminate the frequency amplitude factor in said resultant signal, and synchronous detector means supplied with said resultant signal and synchronized at the frequency of oscillation about said drive axis for yielding a D.-C. output varying with fluid flow.

References Cited by the Examiner

UNITED STATES PATENTS

| | | | |
|---|---|---|---|
| 2,811,854 | 11/1957 | Powers | 73—194 |
| 2,813,423 | 11/1957 | Altfillisch et al. | 73—194 |
| 2,834,209 | 5/1958 | Jones et al. | 73—194 |
| 2,846,577 | 8/1958 | Blasingame | 333—19 |
| 2,865,201 | 12/1958 | Roth | 73—194 |
| 2,911,826 | 11/1959 | Kritz | 73—194 |
| 2,944,213 | 7/1960 | Foerster | 333—19 |
| 2,977,804 | 4/1961 | French | 73—503 |
| 3,005,348 | 10/1961 | Perkins et al. | 73—503 |

OTHER REFERENCES

Elements of Mechanical Vibrations: by Freberg and Kemler, page 12, published by Wiley & Sons in 1947.

A Magnetic Flowmeter for Recording Cardiac Output: by Shirer et al. in IRE Transactions on Medical Electronics, December 1959, pp. 232–234.

RICHARD C. QUEISSER, *Primary Examiner.*

C. A. CUTTING, ROBERT EVANS, JOSEPH P. STRIZAK, J. G. MURRAY, E. D. GILHOOLY,
*Assistant Examiners.*

UNITED STATES PATENT OFFICE
CERTIFICATE OF CORRECTION

Patent No. 3,276,257                           October 4, 1966

Wilfred Roth

It is hereby certified that error appears in the above numbered patent requiring correction and that the said Letters Patent should read as corrected below.

Column 3, line 11, for "in" read -- an --; lines 23 and 24, for "gyroscope" read -- gyroscopic --; line 37, for "differential" read -- differentiated --; line 56, after "conduit" insert -- sections --; column 6, line 21, for "nntegrate" read -- integrate --; column 11, lines 12 to 15, and 45 to 48, strike out "said alternating output signal varying in amplitude with fluid flow and having a frequency amplitude factor $\omega^x$ where $\omega$ is the angular frequency of oscillation about the drive axis and x is at least 1,".

Signed and sealed this 26th day of September 1967.

(SEAL)
Attest:

ERNEST W. SWIDER                         EDWARD J. BRENNER
Attesting Officer                      Commissioner of Patents